United States Patent Office 3,408,137
Patented Oct. 29, 1968

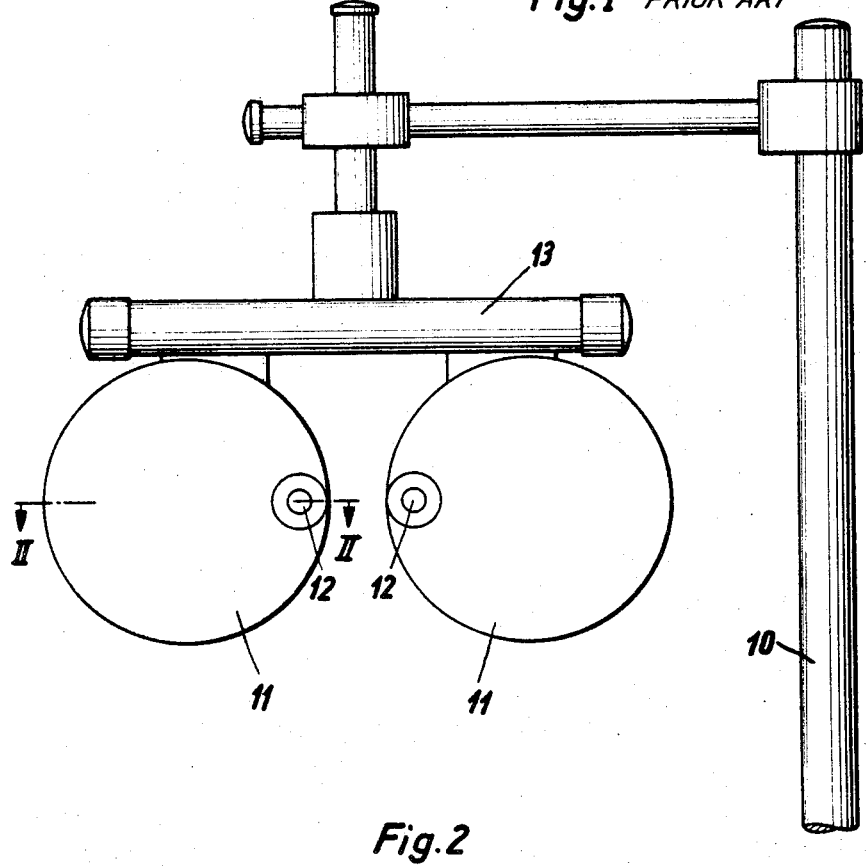

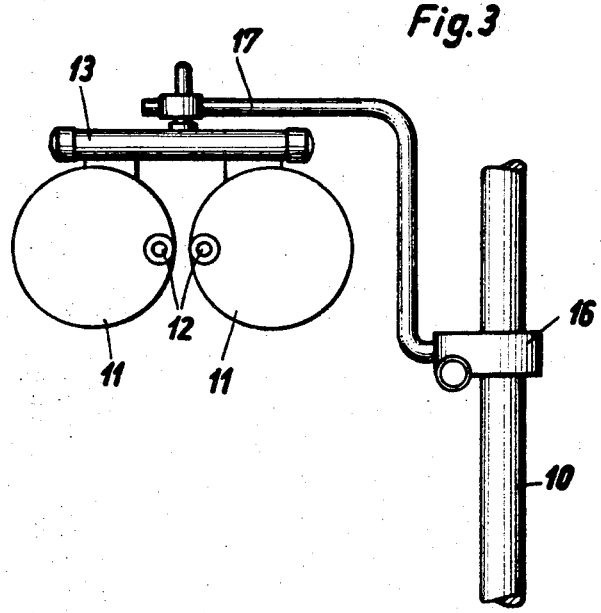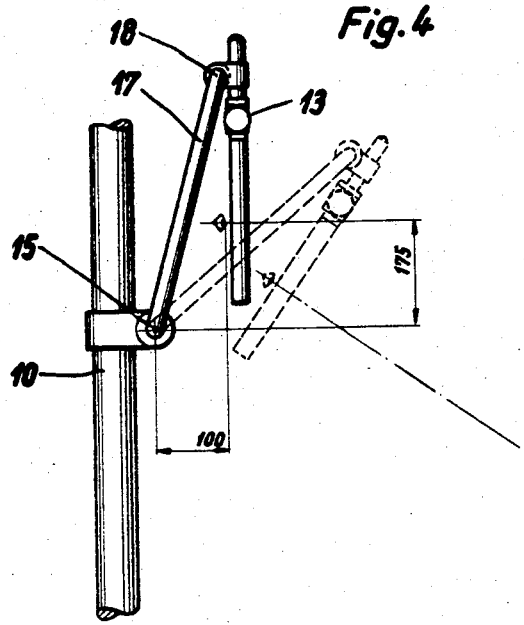

---

3,408,137
EYE TESTING DEVICE WITH TEST LENSES AND PIVOTED SUPPORT
Josef Reiner, Cologne, Germany, assignor to J. D. Möller Optische Werke GmbH, Wedel, Holstein, Germany
Filed May 17, 1963, Ser. No. 281,197
Claims priority, application Germany, Feb. 20, 1963, M 55,842
1 Claim. (Cl. 351—28)

---

ABSTRACT OF THE DISCLOSURE

An eye testing device having a pair of housings containing selectable optical elements mounted on an offset arm which can be clamped in any desired orientation about a horizontal pivot axis and the horizontal pivot axis can be raised or lowered to pass adjacent to the patient's cervical vertebra.

---

Background of the invention

In eye testing, instruments called "phoropters" are being used to an ever increasing degree.

As shown schematically in FIGS. 1 and 2, these instruments consist of two housings 11 with dioptric apertures 12. For the purpose of adjusting the pupillary distance, the housings 11 are adjustably mounted on a support 13, which is in turn mounted on a vertical post 10.

Each of the housings 11 contains two or more Recoss discs (14, FIG. 2) carrying spherical and cylindrical lenses, and at least one such disc carrying auxiliary means which are necessary for adjusting the instrument and for binocular testing. The large number of optical testing elements available in the instrument makes possible rapid and accurate determination of the refraction. An additional advantage lies in the fact that the patient is not burdened with the weight of the test lenses which would otherwise have to be used, while at the same time satisfactory alignment of the various optical testing elements with the patient's line of vision is ensured. With such instruments satisfactory testing of the eyes for distant vision is possible, but only vertical and lateral adjustments in the horizontal direction of vision can be made.

Summary of the invention

The determination of refraction for distant vision forms however only a part of a complete eye examination. For hypermetropic patients the determination of the corrections required for near vision (for example, for reading and working), which differ to a greater or less degree from the correction for distant vision as age increases, are equally important. In many cases too, differences exist between the values of the cylindrical, corrections required for near and distant vision.

The present invention, by contrast, greatly increases the utility of such instruments in functional eye testing. According to one embodiment of the invention, a pair of housings containing test discs, lenses, etc., are mounted on a clamp which is movably mounted on a vertical post by means of an arm and a housing support. The housings are movable on the latter for adjustment of the pupillary distance. The housings, housing support, and arm are arranged to be pivoted as a unit about a horizontal pivot axis and clamped at any desired orientation thereabout. This horizontal pivot axis passes adjacent to the vertical post and by means of said clamp may be clamped at substantially the height of the patient's upper cervical vertebra. Also, the housing support may be made to pivot around a horizontal axis.

Brief description of the drawings

The invention will be described in greater detail, by way of example, with reference to the accompanying drawings, in which:

FIGURE 1 is a view of the device of the prior art;
FIGURE 2 is section through a housing taken along line II—II in FIGURE 1;
FIGURE 3 is a front view of a device embodying the present invention; and
FIGURE 4 is a side view of the device of FIG. 3.

Description of the preferred embodiments

Throughout the drawings the same reference numerals are used to indicate the same parts.

The embodiment of the present invention shown in FIGS. 3 and 4 comprises a vertical post 10 on which a clamp 16 can be moved vertically. A curved arm 17 supports a housing support 13 on which housings 11 are made movable horizontally to adjust the pupillary distance between dioptric apertures 12.

In addition to means for the clamping of the arm 17 at any desired orientation about the horizontal pivot axis 15, at the level of the upper cervical vertebra of a patient, a swivel bearing 18 acts as a connecting element between arm 17 and housing support 13.

In FIGURE 4 are shown the positions of the housing, etc., used for distant vision and for near vision tests.

When using ordinary test lenses for near vision testing, the eyes and the head can be turned in the direction of the object viewed (close reading test). In the adjusting of the eyes for close vision, however, several processes are initiated. The accommodation which is closely associated with the convergence of the axes of the eyes is produced by the ciliary muscle. Furthermore accommodation and convergency are associated with a glancing and a slight rolling of both eyes. Moreover in the case of near viewing the head is as a rule inclined slightly forward.

It is a particular advantage of the invention that all these processes can be taken into account for the near vision test. That is to say, it is possible without subsequent correction to proceed directly from the distant test position to the close test position. Laborious calculations are saved.

In the preferred embodiment the anatomic requirements are particularly favourably met if the swiveling axis 15 is located near the patient's upper cervical vertebra. In this case the pivot axis is located about 175 mm. below the axis of vision and about 100 mm. behind the viewing aperture (FIGURE 4).

What I claim is:

1. An eye testing device, comprising: housing means containing test lenses mounted on rotatable discs for selective interposition in a pair of optical axes while testing the eyes of a patient, the patient's eyes being directed along said optical axes; elongated housing support means for supporting said housings; support arm means having a central portion and first and second end portions, said end portions being parallel and projecting from said central portion in opposite directions; pivot means holding said first end portion of said support arm means for rotation about a horizontal axis so that said central portion of said support arm means may be disposed in selected angular positions about said horizontal axis; vertical post means; clamping block means carrying said first pivot means, said clamping block means being clampable upon said vertical post means at selected heights; clamping means on said clamping block means for clamping said support arm means at any selected angular position about said horizontal axis; and swivel bearing means attached to and extending upwardly from said elongated housing support means for mounting said housing support means parallel to and adjacent said second end portion of said support arm means, to enable pivotal adjustment of said housing about said second end portion; the minimum distance between said optical axes and said horizontal axis being substantially equal to the distance between the line of sight of said patient and a horizontal line passing through the patient's upper cervical vertebra, the minimum distance between a plane including the side of said housing means adjacent said patient and said horizontal axis being substantially equal to the horizontal distance between the face of said patient and his upper cervical vertebra when said patient is seated in an upright position.

References Cited

UNITED STATES PATENTS

| | | | |
|---|---|---|---|
| 814,512 | 3/1906 | Brown | 351—28 |
| 1,494,666 | 5/1924 | Clement | 351—38 |
| 2,015,869 | 10/1935 | Pulz | 88—1 |
| 2,369,806 | 2/1945 | Slonneger | 88—36 |
| 3,051,047 | 8/1962 | Fieux | 88—36 |

FOREIGN PATENTS

| | | |
|---|---|---|
| 232,643 | 9/1944 | Switzerland. |
| 329,155 | 9/1935 | Italy. |

DAVID H. RUBIN, *Primary Examiner.*